Patented Sept. 24, 1929

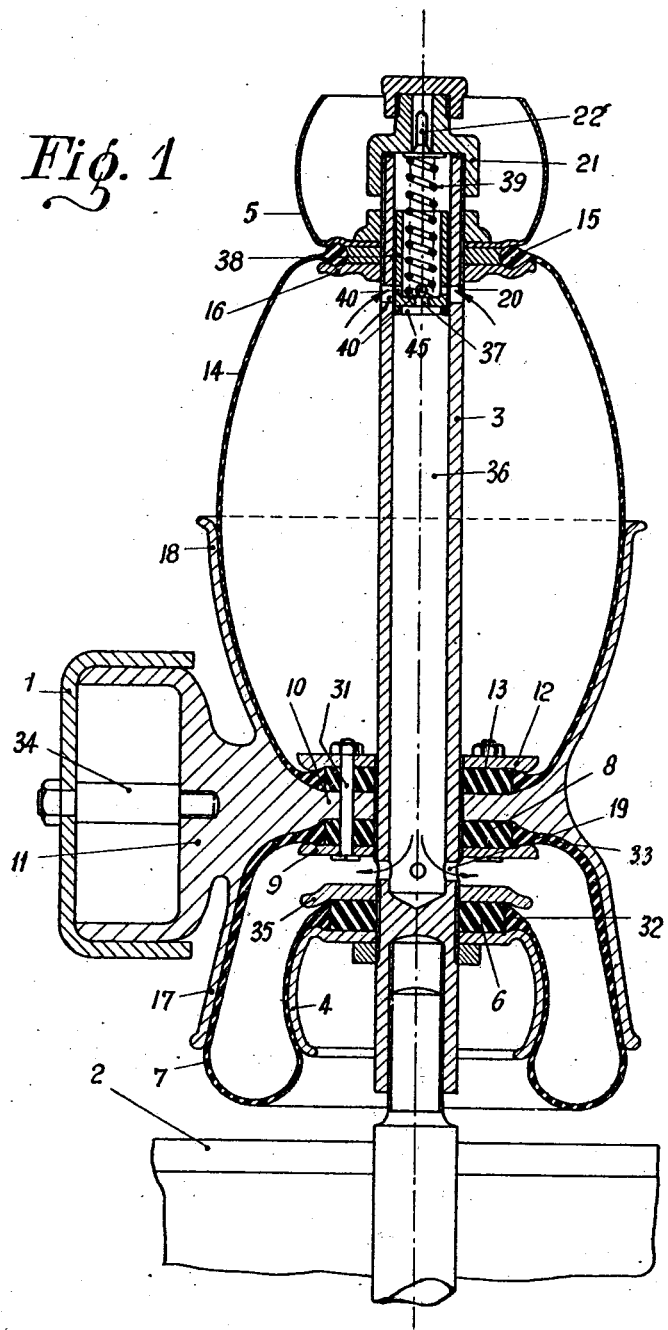

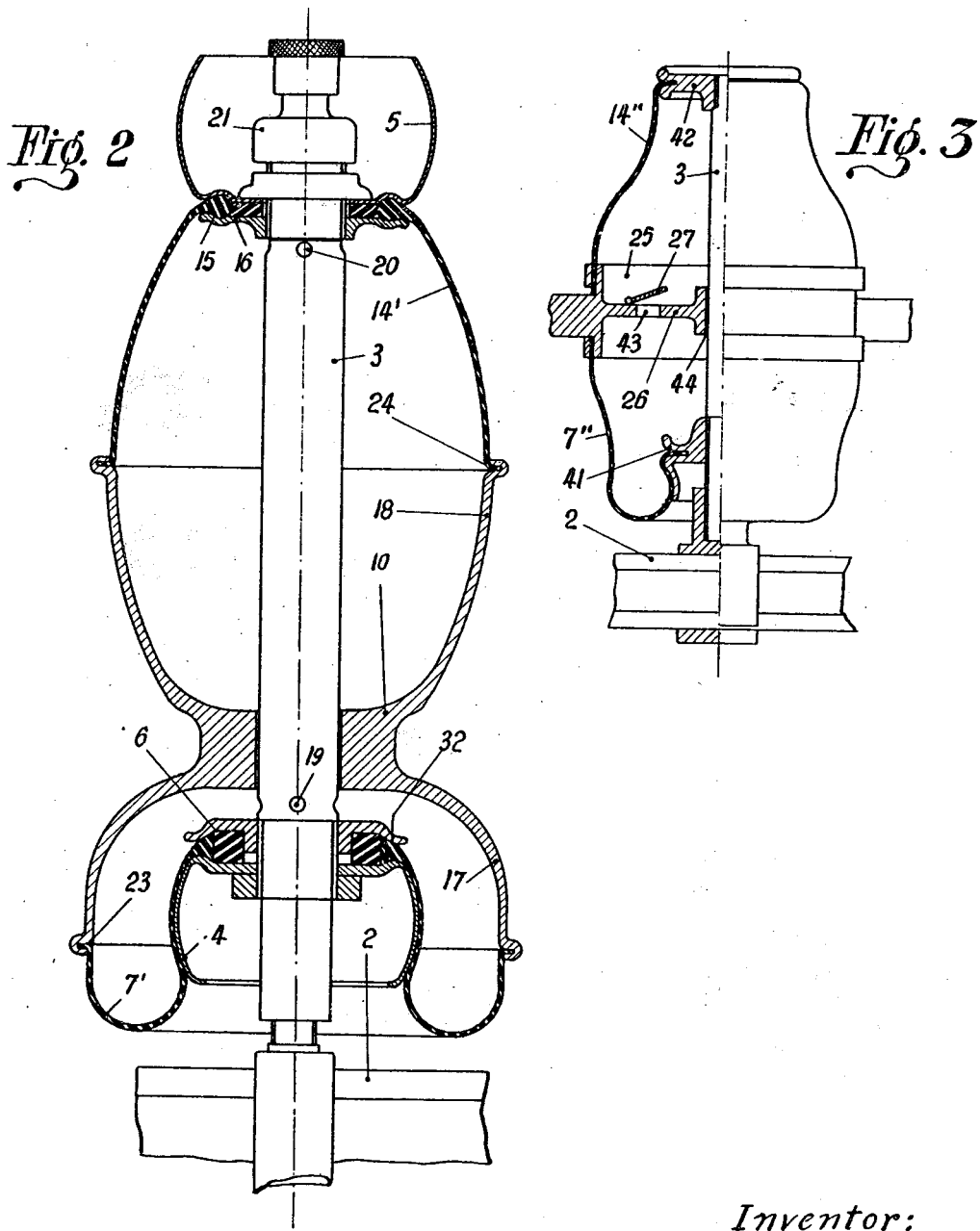

1,729,565

UNITED STATES PATENT OFFICE

ETTORE CARETTA, OF TURIN, ITALY

FLUID-OPERATING SHOCK ABSORBER

Application filed July 20, 1926, Serial No. 123,733, and in Germany July 22, 1925.

The present invention relates to shock absorbers or dampers operating by throttling the flow of a fluid, and has for its object an absorber in which any loss or leakage of operative fluid is prevented by the fact that said absorber comprises two chambers at least one of which is collapsible being made entirely or in part of flexible material, while no moving member is required to extend to outside through a sliding packing member, such packings being subject to leakage of fluid during the operation, as well known.

On the annexed drawings are shown by way of example some embodiments of the present invention, and Figure 1 is the central section of a first construction adapted for a vehicle suspension.

Figure 2 is a similar section of a modified construction,

Figure 3 shows a further modification in which the absorber chambers are provided by an intermediate partition, In the following specification it is assumed to use oil or another liquid as operative fluid, for purpose of description, but any suitable fluid may be used in the absorber.

In Figure 1, 1 is assumed to show the frame of a vehicle and 2 shows the vehicle axle whose movements with respect to said frame are to be damped; to said axle 2 is fastened in any suitable manner a stem 3 having cup shaped parts 4 and 5 fastened on its ends by any suitable means. On the central portion of the bottom cup 4 is clamped by ring 35 a collar 32 of a rubber chamber 7 of balloon or similar shape, having its other mouth collar 33 inserted on said stem 3 and clamped by means of a ring 9 and bolts 31 on a metal ring 10 carried by a fitting 11 fastened to frame 1 by means of bolt 34 or the like.

Between ring 35 and cup 4, as well as between rings 9 and 10, respectively, are located rubber washers 6 and 8 which are expanded under clamping pressure and act to force the edge collars 32 and 33 against edge flanges of the clamping metal parts 4—35 and 9—10, to provide a seal connection.

The collar 13 of a chamber 14 similar to that 7 is clamped on the upper face of ring 10, said chamber 14 having its other collar 15 clamped between the bottom of cup 5 and a ring 16 both fastened on the stem 3.

Two cup members 17 and 18 extend from ring 10, said cups encircling the adjacent portions of chambers 7 and 14 in order to protect and guide them.

The stem 3 has a central passage 36 and end ports 19 and 20 at its portions adjacent rings 35 and 16.

At the top end of the stem 3 is arranged a head 21 having a valve 22 which provides for introducing the operating liquid in the absorber and for adjusting the operation of the same; said valve 22 is held in closed position by a spring 39 which acts also on a sleeve valve 38 seated in the passage 36 of stem 3 and having a central port 37 and side ports 40 registering with ports 20 of stem 3.

In the position of Figure 1 the absorber is in its position in which the vehicle frame 1 and axle 2 are adjacent each other, that is the vehicle spring (not shown) is entirely deflected and the operative liquid fills entirely the chamber 14 which is expanded while chamber 7 is collapsed between cups 4 and 17.

During the subsequent spring return, the ring 10, being solid with the vehicle frame 1, slides along stem 3 and moves with it the adjacent and interconnected ends of chambers 7 and 14, the chamber 14 being collapsed and chamber 7 expanded; therefore the liquid contained in first chamber 14 is caused to pass into the second one through ports 20 and 40, central restricted port 37 of valve 38, passage 36 of stem 3 and ports 19.

Said liquid displacement, which may be throttled to a more or less large extent, and to a different extent with respect to strokes in different directions, produces the required damping action.

On the vehicle spring being again deflected, the liquid leaves chamber 7 through ports 19 and passage 36 and shifts valve 38 from its position against the action of the spring 39, thus producing a comparatively unrestricted flow of liquid and therefore the free respective motion of parts 1 and 2.

During the operation the ring 10 merely slides along the stem 3 while the flexible walls of the chambers 7 and 14 are deformed the said chambers having their opposed ends sealed on the stem 3, and thus the receiver provided by said chambers and containing the operative liquid is sealed; therefore variations in size of the two chambers may take place without any member moving through the walls of said chambers, and any leakage of liquid is prevented. The rings 8 and 13 sliding on the stem 3 are made of flexible and resilient material, as described, and thus the stem 3 is able to float to a certain extent during its respective movement through the ring 10.

The construction of Figure 2 differs from the above described in that each chamber is replaced in part by its cooperating rigid cup member. In this construction the cup 17 has fastened on its mouth the edge 23 of a chamber 7' of flexible material whose collar 32 is fastened on stem 3, and the cup 18 has fastened on its mouth the edge 24 of a chamber 14' of flexible material whose top edge is fastened on the stem 3.

The operation of this construction is the same as that described in connection with Figure 1.

The central portion of the damper, instead of being provided by two reverse cups, as in the construction of Figures 1 and 2, may comprise a flanged rim 25, as illustrated in Figure 3, on whose opposed edges are fastened chambers 7" and 14" made of flexible material and having their other edges fastened on heads 41—42 of stem 3.

The rim 25 comprises a partition 26 having a central port 44 for the passage on stem 3 and one or more other ports 43 each controlled in the known manner as by valves 27 in order to provide for throttled passage of liquid to the required extent in either direction.

In this construction the two vehicle parts whose respective motion is to be damped by the absorbed are connected with members 25 and 3 respectively.

A single collapsible chamber could also be used, said chamber communicating with a rigid chamber in which is directed and stored the liquid driven off from the collapsible chamber.

The flexible members as 7, 14, 7' 14', 7" 14" may be of rubber or of any other more or less rigid material, and they may also consist of metal sheet made flexible by means of corrugations. The flexible walls may also be made of liquid proof cloth, reinforced cloth, leather and so on.

It is to be understood that this invention is not restricted to constructions described and illustrated and it embraces all constructions lying within the spirit of appended claims.

What I claim as my invention and desire to secure by United States Letters Patent is:—

1. A fluid-operating shock absorber comprising a variable chamber having a flexible wall, a second variable chamber having a flexible wall, said chambers being aligned with each other and containing the operative fluid, a stem extending throughout said chambers and seal-connected with the spaced ends of said chambers, a member sliding on said stem and connected with the adjacent ends of said chambers, and means providing a throttled flow of fluid from each other of said chambers, the whole of said chambers and member providing a sealed space.

2. A fluid-operating shock absorber comprising a variable chamber having a flexible wall, a second variable chamber having a flexible wall, said chambers being aligned with each other and containing the operative fluid, a stem extending throughout said chambers and seal-connected with the spaced ends of said chambers, said stem having passages putting said chambers in communication with each other, and a member sliding on said stem and connected with the adjacent ends of said chambers, the whole of said chambers and member providing a sealed space.

3. A fluid-operating shock absorber comprising a variable chamber having a flexible wall, a second variable chamber having a flexible wall, said chambers being aligned with each other and containing the operative fluid, a stem extending throughout said chambers and seal-connected with the spaced ends of said chambers, said stem having passages putting said chambers in communication with each other, means in said passages for throttling the fluid flow from one of said chambers to the other one, and a member sliding on said stem and connected with the adjacent ends of said chambers, the whole of said chambers and member providing a sealed space.

4. A fluid-operating shock absorber comprising a variable chamber having a flexible wall, a second variable chamber having a flexible wall, said chambers being aligned with each other, and containing the operative liquid, a stem extending throughout said chambers and seal-connected with the spaced ends of the same, said stem having an extension beyond one of said chamber spaced ends and having passages putting said chambers in communication with each other, means on said stem extension for introducing the operative fluid into said stem and chambers, and a member sliding on said stem and connected with the adjacent ends of said chambers, the whole of said chambers and member providing a sealed space.

In testimony whereof I have signed my name to this specification.

ETTORE CARETTA.